(12) United States Patent
Chun et al.

(10) Patent No.: US 8,791,174 B2
(45) Date of Patent: *Jul. 29, 2014

(54) INK COMPOSITION AND METHOD OF PREPARING SAME

(75) Inventors: Doris Pik-Yiu Chun, Sunnyvale, CA (US); Hou T. Ng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/259,834

(22) PCT Filed: Dec. 22, 2009

(86) PCT No.: PCT/US2009/069208
§ 371 (c)(1),
(2), (4) Date: Sep. 23, 2011

(87) PCT Pub. No.: WO2011/078854
PCT Pub. Date: Jun. 30, 2011

(65) Prior Publication Data
US 2012/0252960 A1 Oct. 4, 2012

(51) Int. Cl.
| | | |
|---|---|---|
| A61K 9/16 | (2006.01) |
| B41J 2/01 | (2006.01) |
| B41J 2/17 | (2006.01) |
| B41J 2/175 | (2006.01) |
| C08F 8/30 | (2006.01) |
| C08G 18/65 | (2006.01) |
| C08K 5/01 | (2006.01) |
| C08L 31/00 | (2006.01) |
| C08L 39/00 | (2006.01) |
| C08L 53/00 | (2006.01) |
| C09D 5/00 | (2006.01) |
| C09D 5/02 | (2006.01) |
| C09D 11/00 | (2014.01) |
| G01D 11/00 | (2006.01) |
| H01B 3/44 | (2006.01) |

(52) U.S. Cl.
USPC .................. 523/160; 347/1; 347/85; 347/95; 347/100; 523/161; 524/474; 524/476; 524/490; 524/491; 524/543; 524/555; 524/556

(58) Field of Classification Search
USPC .......... 523/160, 161; 524/474, 476, 490, 491, 524/543, 555, 556; 347/1, 85, 95, 100
See application file for complete search history.

(56) References Cited

U.S. PATENT DOCUMENTS

| | | | |
|---|---|---|---|
| 4,758,276 A | 7/1988 | Lin et al. | |
| 5,592,204 A | 1/1997 | Lin et al. | |
| 6,053,438 A | 4/2000 | Romano, Jr. et al. | |
| 6,166,105 A | 12/2000 | Santilli et al. | |
| 6,770,689 B1 | 8/2004 | Yoshimura et al. | |
| 7,008,744 B2 | 3/2006 | Horie et al. | |
| 7,173,077 B2 | 2/2007 | Yoshimura et al. | |
| 8,496,324 B2 * | 7/2013 | Anthony et al. | ............... 347/100 |

FOREIGN PATENT DOCUMENTS

| | | |
|---|---|---|
| EP | 1111017 | 6/2001 |
| EP | 1344802 | 9/2003 |
| EP | 1493783 | 1/2005 |

OTHER PUBLICATIONS

The Lubrizol Corporation, Product Guide Hyperdispersants, 2008.
The Lubrizol Corporation, Technology and Benefits-Hyperdispersants, 2008.

* cited by examiner

Primary Examiner — Patrick Niland

(57) ABSTRACT

An ink composition includes a particulate pigment, a hydrocarbon vehicle, an organic polyamine and an organic polyacid. A ratio by weight percent of the organic polyamine to the organic polyacid in the hydrocarbon vehicle is sufficient to render a conductivity of the ink composition to equal to or less than 15 nanosiemens per centimeter. The ink composition is prepared by combining the particulate pigment with a composition that includes the hydrocarbon vehicle, the organic polyamine and the organic polyacid. The combination is subjected to conditions under which the particulate pigment becomes dispersed in the composition.

17 Claims, No Drawings

INK COMPOSITION AND METHOD OF PREPARING SAME

CROSS-REFERENCE TO RELATED APPLICATIONS

N/A

STATEMENT REGARDING FEDERALLY SPONSORED RESEARCH OR DEVELOPMENT

N/A

BACKGROUND

Known printing techniques require various ink formulations. Such techniques include, for example, digital printing, laser printing, electro-ink printing, electro-photographic printing, displays and ink jet printing. Since the mid-1980s Color Electro-photographic (EP) Printing commonly known as laser printing technology, has been a popular choice with businesses and personal users who demand high quality, professional looking printed communications. With EP currently in its third generation of significant improvements, segment leaders are making key advancements in system design and supplies refinement and improvement.

With any printing technique utilizing an ink that comprises particles, it is important that the particles remain dispersed in the ink medium for extended periods of time. Significant sedimentation can result in poor print quality in any of the above techniques. For example, electro-photographic printing or laser printing requires ink compositions having high dispersion of the particulate pigments in the ink composition. In addition, it is important that the ink composition exhibit low conductivity.

One method for reducing sedimentation in ink compositions involves the addition of dispersants to the ink composition. Three major categories of dispersants are ionic (anionic and cationic), non-ionic and amphoteric. Stabilization of ink dispersions may be achieved with ionic dispersants, but the dispersants give rise to highly charged compositions that are not suitable for at least some types of printing that require minimal or no charge.

DETAILED DESCRIPTION

Some embodiments of the present invention are directed to an ink composition comprising a particulate pigment, a hydrocarbon vehicle, an organic polyamine and an organic polyacid. The ratio by weight percent of the organic polyamine to the organic polyacid in the hydrocarbon vehicle is sufficient to render the conductivity of the ink composition to equal to or less than 15 nanosiemens per centimeter. In some embodiments of the ink composition, the particulate pigment is an encapsulated pigment. In some embodiments of the ink composition, the hydrocarbon vehicle is an isoparaffinic solvent. In some embodiments of the ink composition, the organic polyamine has a fatty acid backbone with oligomeric amine-containing groups. In some embodiments of the ink composition, the organic polyacid is a polymeric hydroxy fatty acid.

Some embodiments of the present invention are directed to a method for preparing an ink composition. A particulate pigment is combined with a composition comprising a hydrocarbon vehicle, an organic polyamine and an organic polyacid. The ratio by weight percent of the organic polyamine to the organic polyacid in the hydrocarbon vehicle is sufficient to render the conductivity of the ink composition to less than 15 nanosiemens per centimeter. The combination is subjected to conditions under which the particulate pigment is dispersed in the composition.

Some embodiments of the present invention are directed to an ink composition comprising a particulate pigment, an isoparaffinic hydrocarbon vehicle, an organic polyamine comprising an unsaturated polymeric fatty acid backbone and one or more amine-containing groups, and a poly(12-hydroxystearic acid). The ratio of a weight percent of the organic polyamine to a weight percent of the poly(12-hydroxy-stearic acid) in the isoparaffinic hydrocarbon vehicle is sufficient to render a conductivity of the ink composition to less than or equal to 15 nanosiemens per centimeter.

The particulate pigment of the ink composition is one that is dispersible in the hydrocarbon vehicle. The term "dispersible" means that the particulate pigment is relatively evenly distributed throughout the hydrocarbon vehicle as distinct particles. The particulate pigment may be inorganic or organic. In some embodiments, the pigment of the ink composition is a pigment coated with or encapsulated in an organic polymer. The pigment may be a naturally-occurring pigment or a synthetic pigment. The pigment can be of any color including, but not limited to, black, blue, brown, cyan, green, white, violet, magenta, red, orange and yellow, as well as spot colors from mixtures thereof. For electro-photographic printing important colors include Cyan (C), Magenta (M), Yellow (Y), and Black (K), which are precisely layered to create thousands of other colors.

The particulate pigment may be a single particulate pigment or a mixture of two or more particulate pigments. Thus, there may be at least one particulate pigment or at least two particulate pigments or at least three particulate pigments, for example. The number of pigments in a mixture of pigments that comprise the particulate pigment is in the range of 2 to about 5, or 2 to about 4, or 2 to about 3.

The shape of the particulate pigment may be regular or irregular. The particulate pigment may be in the form of a bead, flake, plate, rod, platelet, cube and column, for example. In some embodiments the cross-sectional shape of the particulate pigment may be circular, triangular, square, quadrangular, hexagonal, oval, scalloped, corrugated, or ellipsoidal, for example.

The particle size (cross-sectional dimension) of the particulate pigment is in a range from about 1 nanometer (nm) to about 500 nm, or from about 1 nm to about 400 nm, or from about 1 nm to about 300 nm, or from about 1 nm to about 200 nm, or from about 1 nm to about 100 nm, or from about 1 nm to about 50 nm, or from about 5 nm to about 500 nm, or from about 5 nm to about 400 nm, or from about 5 nm to about 300 nm, or from about 5 nm to about 200 nm, or from about 5 nm to about 100 nm, or from about 5 nm to about 50 nm, or from about 10 nm to about 500 nm, or from about 10 nm to about 400 nm, or from about 10 nm to about 300 nm, or from about 10 nm to about 200 nm, or from about 10 nm to about 100 nm, or from about 10 nm to about 50 nm.

Examples of organic pigments that may be present in the ink composition include, by way of illustration and not limitation, perylenes, phthalocyanine pigments (for example, phthalo green, phthalo blue), cyanine pigments (Cy3, Cy5, and Cy7), naphthalocyanine pigments, nitroso pigments, monoazo pigments, diazo pigments, diazo condensation pigments, basic dye pigments, alkali blue pigments, blue lake pigments, phloxin pigments, quinacridone pigments, lake pigments of acid yellow 1 and 3, isoindolinone pigments, dioxazine pigments, carbazole dioxazine violet pigments, alizarine lake pigments, vat pigments, phthaloxy amine pigments, carmine lake pigments, tetrachloroisoindolinone pigments, perinone pigments, thioindigo pigments, anthraquinone pigments and quinophthalone pigments, and mixtures of two or more of the above and derivatives of the above.

By way of illustration and not limitation, representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128, and Pigment Yellow 138. Other examples of pigments include those of the HOSTAFINE® series (trademark of Clariant GmbH, Frankfurt, Germany), the PALIOGEN® series (trademark of BASF Aktiengesellschaft, Ludwigshafen, Germany), the HELIOGEN® series (trademark of BASF Aktiengesellschaft, Ludwigshafen, Germany), the SUDAN® series, the HOSTPERM® series and the HELICO® series (trademark of Heubach GmbH, Langelsheim, Germany), for example.

Inorganic pigments that may be present in the pigment dispersion, include, for example, metal oxides (for example, titanium dioxide, electrically conductive titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides, metal chlorides, and mixtures of two or more thereof.

In some embodiments the particulate pigment is coated with or encapsulated within a polymeric material. The polymer of the coating or encapsulation is generally about 1 to about 10,000 monomer units or more in length, or about 10 to about 10,000 monomer units in length, or about 100 to about 10,000 monomer units in length, or about 500 to about 10,000 monomer units in length, or about 1,000 to about 10,000 monomer units in length, or about 2,000 to about 10,000 monomer units in length, or about 3,000 to about 10,000 monomer units in length, or about 5,000 to about 10,000 monomer units in length, or about 10 to about 8,000 monomer units in length, or about 100 to about 8,000 monomer units in length, or about 1,000 to about 8,000 monomer units in length, or about 100 to about 7,000 monomer units in length, for example. The number of monomer units depends on the number of atoms in the monomer unit chain, and the composition of the monomer unit, for example.

In some embodiments the molecular weight of the polymer is about 90 to about 900,000 or more, or about 180 to about 900,000, or about 1,000 to about 900,000, or about 10,000 to about 900,000, or about 100,000 to about 900,000, or about 100 to about 750,000, or about 500 to about 750,000, or about 1,000 to about 750,000, or about 10,000 to about 750,000, or about 100,000 to about 750,000, or about 100 to about 500,000, or about 200 to about 500,000, or about 1,000 to about 500,000, or about 10,000 to about 500,000, or about 100,000 to about 500,000, for example. In some embodiments, the monomer units of the polymer comprise carbon atoms and may additionally comprise one or more heteroatoms such as, for example, oxygen, sulfur, nitrogen, phosphorus, and silicon.

The polymer may be linear or branched or a combination thereof. A linear polymer comprises a linear chain of atoms and a branched polymer comprises a branched chain of atoms. Each atom of the linear chain may have one or more substituents in place of hydrogen. In some embodiments, the polymer may be a copolymer comprising more than one type of monomer unit. The relationship of the different monomer units in the polymer may be alternating, random, and periodic for example, and may also be in a block copolymer arrangement where blocks of repeating monomer units form the polymer chain.

Coated or encapsulated pigments may be prepared from monomers in a number of approaches known in the art. The term "monomer" means a molecule capable of undergoing polymerization to form a polymer. Examples of approaches for preparing polymers, by way of illustration and not limitation, include emulsification or emulsion polymerization, free radical polymerization, bulk polymerization, transition metal catalyzed coupling, condensation (step reaction) polymerization, living polymerization, living radical polymerization, addition (chain reaction) polymerization (anionic, etc.), coordination polymerization, ring opening polymerization, solution polymerization, step-growth polymerization, plasma polymerization, Ziegler process, radical polymerization, atom transfer radical polymerization, reversible addition fragmentation, chain transfer polymerization, and nitroxide mediated polymerization, for example. Other methods of coating or encapsulating the particulate pigment include, for example, mini-emulsion polymerization, inversion emulsification and inverse-emulsion polymerization. The conditions employed for coating or encapsulation of the particulate pigment depend on the particular method employed.

In some embodiments the polymer coating or encapsulating material is a latex. The latex polymer of the coating or encapsulation may be derived from a number of monomers such as, by way of example and not limitation, vinyl monomers, allylic monomers, olefins, unsaturated hydrocarbons, and mixtures thereof. Classes of vinyl monomers include, but are not limited to, methacrylic acid, methacrylates, methacrylamide, N- and N,N-disubstituted methacrylamides, vinyl aromatic monomers, vinyl halides and vinyl esters of carboxylic acids (e.g., vinyl acetate), for example.

Examples of methacrylates include, but are not limited to, methyl methacrylate, ethyl methacrylate, propyl methacrylate, isopropyl methacrylate, n-butyl methacrylate, iso-butyl methacrylate, tert-butyl methacrylate, 2-ethylhexyl methacrylate, lauryl methacrylate, isobornyl methacrylate, cyclohexyl methacrylate, 3,3,5-trimethyl-cyclohexyl methacrylate, isocane methacrylate, glycidyl methacrylate, 3,4-epoxycyclohexylmethylmethacrylate, 2-(3,4-epoxycyclohexyl)ethylmethacrylate, hydroxyethyl methacrylate, hydroxypropyl methacrylate, hydroxybutyl methacrylate, methacrylic anhydride, diethyleneglycol bismethacrylate, 4,4'-isopropylidenediphenol bismethacrylate (Bisphenol A dimethacrylate), alkoxylated 4,4'-isopropylidenediphenol bismethacrylate, trimethylolpropane trismethacrylate and alkoxylated trimethylol-propane trismethacrylate.

Examples of vinyl aromatic monomers that may be used include, but are not limited to, styrene, styrene-butadiene, p-chloromethylstyrene, divinyl benzene, vinyl naphthalene and divinyl naphthalene. Vinyl halides that may be used include, but are not limited to, vinyl chloride and vinylidene fluoride. Vinyl esters of carboxylic acids that may be used include, but are not limited to, vinyl acetate, vinyl butyrate, vinyl 3,4-di-methoxybenzoate, vinyl malate and vinyl benzoate.

The amount of the particulate pigment in the ink composition depends on a number of factors, for example, the nature of the pigment, the nature of the use of the ink composition, the nature of the jetting mechanism for the ink, and the nature of additives. In some embodiments the amount (percent by weight) of particulate pigment in the ink composition is about 0.1% to about 20%, or about 0.1% to about 15%, or about 0.1% to about 10%, or about 0.1% to about 5%, or about 0.5% to about 20%, or about 0.5% to about 15%, or about 0.5% to about 10%, or about 0.5% to about 5%, or about 1% to about 20%, or about 1% to about 15%, or about 1% to about 10%, or about 1% to about 5%, or about 2% to about 20%, or about 2% to about 15%, or about 2% to about 10%, or about 2% to about 5%, or about 3% to about 20%, or about 3% to about 15%, or about 3% to about 10%, or about 3% to about 5%, for example. The amount of pigment present in the pigment dispersion may range between any combination of these values, inclusive of the recited values.

The hydrocarbon vehicle may be a hydrocarbon that is a liquid at ambient temperature (about 20° C. to 30° C.) and is usually dielectric. The hydrocarbon may be branched, unbranched or cyclic. The hydrocarbon may have about 10 to about 20 carbon atoms, or about 10 to about 15 carbon atoms, or about 10 to about 14 carbon atoms, or about 10 to about 13 carbon atoms, or about 11 to about 15 carbon atoms, or about 11 to about 14 carbon atoms, or about 11 to about 13 carbon atoms. In some embodiments the hydrocarbon has a boiling point at, or in a range found within, about 120° C. to about 350° C., or about 120° C. to about 325° C., or about 120° C. to about 300° C., or about 150° C. to about 325° C., or about 150° C. to about 275° C., or about 180° C. to about 250° C., for example. The boiling point range of a boiling fraction containing a single hydrocarbon or a mixture of hydrocarbons may range within or between any combinations of the above values, inclusive of the recited values. The hydrocarbon may be an alkane, an isoalkane, a tertiary alkane, a cyclic or multicyclic alkane or an aromatic compound, for example. In some embodiments the hydrocarbon is a mixture of two or more alkanes, isoalkanes, tertiary alkanes, a cyclic or multicyclic alkane or an aromatic compound where the mixture is a specific boiling point fraction such as, by way of illustration and not limitation, a mixture of alkanes having a boiling point fraction of about 180-190° C., or about 170-180° C., or about 175-185° C., or about 160-170° C., or about 150-160° C., or about 182-190° C., for example (which are boiling point ranges found within about 120° C. to about 300° C. as mentioned above). In some embodiments the hydrocarbon is an isoparaffinic hydrocarbon solvent. Particular examples of isoparaffinic hydrocarbons, by way of illustration and not limitation, include ISOPAR® isoparaffinic hydrocarbon solvents from ExxonMobil Chemical Company, Houston Tex, such as solvents known as ISOPAR® L, ISOPAR® K, ISOPAR® H, ISOPAR® G, ISOPAR® V, and ISOPAR® M.

A suitable hydrocarbon is selected such that the combination of the pigment, the organic polyamine and the organic polyacid in the hydrocarbon vehicle results in a conductivity of the ink composition of equal to or less than about 15, or less than about 14, or less than about 13, or less than about 12, or less that about 11, or less than about 10, or less than about 9, or less than about 8, or less than about 7, or less that about 6, or less than about 5, or less than about 4, or less than about 3, or less than about 2, or less that about 1, or less than about 0.5, or less that about 0.1, nanosiemens (ns) per centimeter (cm), for example. In some embodiments the conductivity is in the range of about 0.1 or less to about 15 ns per cm, or about 0.1 or less to about 10 ns per cm, or about 0.1 or less to about 5 ns per cm, or about 0.5 or less to about 15 ns per cm, or about 0.5 or less to about 10 ns per cm, or about 0.5 or less to about 5 ns per cm, for example. Conductivity may be measured by any standard instrument for measurement of conductivity or resistance such as, for example, microprocessor-based conductivity analyzers, non-microprocessor-based conductivity analyzers, analyzers employing contacting style sensors or non-contacting style sensors, and a Whetstone Bridge, for example. Other physical characteristics of the hydrocarbon may be determined by the specific application of the ink composition.

The organic polyamine of the ink composition is a polymeric compound that is comprised primarily of carbon, hydrogen and nitrogen (where nitrogen is part of an amine group). The polymer may be a linear polymer or a branched polymer or a combination thereof. A linear polymer comprises a linear chain of atoms and a branched polymer comprises a branched chain of atoms. In some embodiments, one or more atoms of the linear chain may have one or more substituents in place of hydrogen. In some embodiments, the polymer may be a copolymer comprising more than one type of monomer unit. The relationship of the different monomer units in the polymer may be alternating, random or periodic, for example. The polymer may also be in a block copolymer arrangement where blocks of repeating monomer units form the polymer chain.

The organic polyamine has a molecular weight of at least about 80 atomic mass units (amu), or at least about 800 amu, or at least about 900 amu, or at least about 1000 amu, or at least about 2000 amu, or at least about 3000 amu, or at least about 4000 amu, or at least about 5000 amu, or at least about 10,000 amu, or at least about 50,000 amu, or at least about 100,000 amu, for example. The organic polyamine has at least about 3, or at least about 4, or at least about 5, or at least about 6, or at least about 7, or at least about 8, or at least about 9, or at least about 10 amine groups, for example. The polyamine is about 1 to about 10,000 monomer units or more in length, or about 10 to about 10,000 monomer units in length, or about 100 to about 10,000 monomer units in length, or about 500 to about 10,000 monomer units in length, or about 1,000 to about 10,000 monomer units in length, or about 2,000 to about 10,000 monomer units in length, or about 3,000 to about 10,000 monomer units in length, or about 5,000 to about 10,000 monomer units in length, or about 10 to about 8,000 monomer units in length, or about 100 to about 8,000 monomer units in length, or about 1,000 to about 8,000 monomer units in length, or about 100 to about 7,000 monomer units in length, for example. The number of monomer units depends on the number of atoms in the monomer unit chain, and the composition of the monomer unit, for example.

In some embodiments the organic polyamine has a molecular weight (amu) of about 90 to about 900,000 or more, or about 180 to about 900,000, or about 1,000 to about 900,000, or about 10,000 to about 900,000, or about 100,000 to about 900,000, or about 100 to about 750,000, or about 500 to about 750,000, or about 1,000 to about 750,000, or about 10,000 to about 750,000, or about 100,000 to about 750,000, or about 100 to about 500,000, or about 200 to about 500,000, or about 1,000 to about 500,000, or about 10,000 to about 500,000, or about 100,000 to about 500,000, or about 1000 to about 10,000, or about 1000 to about 5,000, for example. In some embodiments, the monomer units of the polymer comprise carbon atoms and may additionally comprise one or more heteroatoms such as, for example, oxygen, sulfur, nitrogen or phosphorus.

In some embodiments, the organic polyamine has a number of amine groups, for example, about 3 to about 100, or about 3 to about 80, or about 3 to about 60, or about 3 to about 40, or about 3 to about 30, or about 3 to about 20, or about 3 to about 10, or about 3 to about 5, or about 4 to about 100, or about 4 to about 80, or about 4 to about 60, or about 4 to about 40, or about 4 to about 30, or about 4 to about 20, or about 4 to about 10, or about 4 to about 5, about 5 to about 100, or about 5 to about 80, or about 5 to about 60, or about 5 to about 40, or about 5 to about 30, or about 5 to about 20, or about 5 to about 10 amine groups. The term "amine group" or "amine groups" refers to saturated primary, secondary and tertiary amine groups. The amine group does not comprise an unsaturation (double or triple bond) and, thus, the term does not include imine groups, nitrile groups, aziridine groups, azo groups, hydrazone groups, amidine groups, for example. Organic polyamine polymers that may be employed in the present embodiments are commercially available or may be synthesized using standard polymerization techniques.

The solubility of the organic polyamine in the hydrocarbon vehicle is at least about 85%, or at least about 90%, or at least about 95%, or at least about 99%, or 100%, for example. In some embodiments the organic polyamine is about 80 to about 100%, or about 85 to about 100%, or about 90 to about 100%, or about 95 to about 100%, soluble in the hydrocarbon vehicle.

In some embodiments the organic polyamine comprises an unsaturated polymeric fatty acid backbone and at least one oligomeric amine-containing group. The fatty acid backbone may be derived from a fatty acid monomer, or a derivative thereof (e.g., ester, amide or carbonate) having about 10 to about 30 carbon atoms, or about 10 to about 25 carbon atoms, or about 10 to about 20 carbon atoms, or about 10 to about 15 carbon atoms, or about 12 to about 30 carbon atoms, or about 12 to about 25 carbon atoms, or about 12 to about 20 carbon atoms, or about 12 to about 15 carbon atoms, for example. The fatty acid monomer may be saturated or unsaturated (comprising at least one double or triple bond). The number of unsaturations (double or triple bonds) in the fatty acid monomer of the fatty acid backbone may be 0 to about 10, or 0 to about 5, or 0 to about 4, or 0 to about 3, or 0 to about 2, or 0 to 1, or 1 to about 10, or 1 to about 5, or 1 to about 4, or 1 to about 3, or 1 to 2, or about 2 to about 10, or about 2 to about 5, or about 2 to about 4, or about 2 to about 3, for example.

The oligomeric amine-containing group comprises 1 to about 100, or 1 to about 80, or 1 to about 60, or 1 to about 40, or 1 to about 20, or 1 to about 10, monomeric groups, each of which comprise 2 to about 100, or 2 to about 80, or 2 to about 60, or 2 to about 40, or 2 to about 20, or 2 to about 10 carbon atoms and may further comprise one or more heteroatoms such as oxygen, nitrogen, sulfur and phosphorus and combinations thereof, for example. In some embodiments, the oligomeric amine-containing group has, for example, 1 to about 10, or 1 to about 5, or 1 to about 4, or 1 to about 3, or 1 to 2 amine groups or 1 amine group. The oligomeric amine-containing group or groups may be pendant from one or more positions along the polymeric fatty acid backbone including terminal positions. The positions may be random or controlled and the arrangement of positions can be a specific steric arrangement or spatial arrangement or optical (chiral) arrangement. The number of oligomeric amine-containing groups in the organic polyamine is, for example, 1 to about 10, or 1 to about 5, or 1 to about 4, or 1 to about 3, or 1 to 2 or 1.

Specific examples, by way of illustration and not limitation, of oligomeric amine-containing groups include those having a polymer backbone that comprises monomeric units of about 2 to about 10 carbon atoms, or about 2 to about 8 carbon atoms, or about 2 to about 6 carbon atoms or about 2 to about 5 carbon atoms, wherein the monomeric units further comprise 1 to about 5 nitrogen atoms, or 1 to about 4 nitrogen atoms, or 1 to about 3 nitrogen atoms, or 1 to about 2 nitrogen atoms. Examples of such oligomeric amine-containing groups, by way of illustration and not limitation, include polyallylamine, polydiallylamine, polydimethylallylamine, poly(L-lysine), polyvinylamine, polypropylamine, poly(diallyldimethylamine), poly(3-acrylamidopropyl)trimethylamine, poly[2-acryloyoloxyethyl]trimethylamine, poly(3-methacrylamidopropyl)trimethylamine, and poly[2-methacryloyloxyethyl]-trimethylamine, including combinations thereof and derivatives thereof.

In some embodiments, by way of illustration and not limitation, the organic polyamine is a polyethylene amine, polyethylene N-substituted amine, a polyethylene comprising one or more pendant groups selected from the groups consisting of primary amine groups, secondary amine groups, tertiary amine groups, succinimide groups, aniline groups, and pyrrole groups, a polyethylene amine with one or more pendant oligomeric amine-containing groups, or polyethylene N-substituted amine with one or more oligomeric amine-containing groups.

In some embodiments, the organic polyamine is a cationic polymer as a result of the protonation of one or more of the amine groups of the organic polyamine. In some embodiments, the number of positive charges on the cationic polymer is in the range of 1 to about 10, or 1 to about 5, or about 2 to about 10, or about 2 to about 5, or about 3 to about 10, or about 3 to about 5, or about 4 to about 10, or about 4 to about 8, or about 4 to about 6, for example. The cationic polymer generally includes a counter ion, the nature of which depends on the nature of the cation, for example. Specific examples, by way of illustration and not limitation, of counter ions for cationic polymers include halogen anion such as chloride, bromide, iodide, carboxylic acid anion, phosphoric acid anion, sulfuric acid anion, hexafluorophosphorus anion, tetraphenyl boronic anion, chlorate, perchlorate, nitrate, and phenolate. Cationic polymers that may be employed in the present embodiments are commercially available or may be synthesized using standard polymerization techniques.

In one embodiment the organic polyamine is a material available from The Lubrizol Corporation (Wickliffe Ohio) and Chevron Phillips Chemical Company (The Woodlands Tex.); such materials include, for example, SOLSPERSE® OS 240430E, SOLSPERSE® SP19000 and OLOA® 11000, respectively.

The amount (by weight percent) of the organic polyamine is that which is sufficient to render the conductivity of the ink composition to a level discussed above, which is at least equal to or less than about 15 nanosiemens per centimeter. The amount is dependent on the nature of the particulate pigment, the nature of the hydrocarbon vehicle, the nature of the organic polyacid, for example. In some embodiments the amount of the organic polyamine in the ink composition may be about 0.5 to about 10%, or about 0.5 to about 5%, or about 1 to about 4%, or about 1 to about 2%, or about 1%, for example. In some embodiments the amount of the organic polyamine in the ink composition is determined empirically by preparing ink compositions containing varying amounts of the components and measuring the conductivity of the ink composition.

The organic polyacid of the ink composition is a polymeric compound that is comprised primarily of carbon, hydrogen and oxygen. The polymeric compound may be a linear chain polymeric compound or a branched chain polymeric compound or a combination thereof. One or more atoms of the linear chain may have one or more substituents in place of hydrogen. In some embodiments, the polymer may be a copolymer comprising more than one type of monomer unit. The relationship of the different monomer units in the polymer may be alternating, random or periodic, for example, and the polymer may also be in a block copolymer arrangement where blocks of repeating monomer units form the polymer chain. In some embodiments the organic polyacid is non-ionic.

The organic polyacid and has a molecular weight of at least about 80 atomic mass units (amu), or at least about 100 amu, or at least about 900 amu, or at least about 1,000 amu, or at least about 2,000 amu, or at least about 3,000 amu, or at least about 4,000 amu, or at least about 5,000 amu, or at least about 10,000 amu, or at least about 50,000 amu, or at least about 100,000 amu, for example.

The organic polyacid is generally about 1 to about 10,000 monomer units or more in length, or about 10 to about 10,000 monomer units in length, or about 100 to about 10,000 monomer units in length, or about 500 to about 10,000 monomer units in length, or about 1,000 to about 10,000 monomer units in length, or about 2,000 to about 10,000 monomer units in length, or about 3,000 to about 10,000 monomer units in length, or about 5,000 to about 10,000 monomer units in length, or about 10 to about 8,000 monomer units in length, or about 100 to about 8,000 monomer units in length, or about 1,000 to about 8,000 monomer units in length, or about 100 to about 7,000 monomer units in length, for example. The number of monomer units depends on the number of atoms in the monomer unit chain, and the composition of the monomer unit, for example.

In some embodiments the organic polyacid has a molecular weight (amu) of about 90 to about 900,000 or more, or about 180 to about 900,000, or about 1,000 to about 900,000, or about 10,000 to about 900,000, or about 100,000 to about 900,000, or about 100 to about 750,000, or about 500 to about 750,000, or about 1,000 to about 750,000, or about 10,000 to about 750,000, or about 100,000 to about 750,000, or about 100 to about 500,000, or about 200 to about 500,000, or about 1,000 to about 500,000, or about 10,000 to about 500,000, or about 100,000 to about 500,000, for example. In some embodiments, the monomer units of the polymer comprise carbon atoms and may additionally comprise one or more heteroatoms such as, for example, oxygen, sulfur, nitrogen and phosphorus, and combinations thereof.

In some embodiments, the organic polyacid has, for example, 1 to about 10, or 1 to about 5, or 1 to about 4, or 1 to about 3, or 1 to 2 carboxyl groups or 1 carboxyl group and 1 to about 10, or 1 to about 5, or 1 to about 4, or 1 to about 3, or 1 to 2 hydroxyl groups or 1 hydroxy group. The hydroxyl groups and the carboxyl groups referred to above are not derivatized, for example, non-esterified, and are, therefore, by definition "free." The hydroxyl groups of a hydroxy fatty acid monomer that form esters with carboxyl groups of the hydroxy fatty acid monomer in a poly condensation polymerization are not included within the numbers set forth above for free hydroxy groups and free carboxyl groups. Organic polyacids that may be employed in the present embodiments are commercially available or may be synthesized using standard polymerization techniques.

The solubility of the organic polyacid in the hydrocarbon vehicle is at least about 85%, or at least about 90%, or at least about 95%, or at least about 99%, or 100%, for example. In some embodiments the organic polyacid is about 80 to about 100%, or about 85 to about 100%, or about 90 to about 100%, or about 95 to about 100%, soluble in the hydrocarbon vehicle.

In some embodiments the organic polyacid is a polymeric hydroxy fatty acid (poly(hydroxy fatty acid)). The fatty acid has about 10 to about 30 carbon atoms, or about 10 to about 25 carbon atoms, or about 10 to about 20 carbon atoms, or about 10 to about 15 carbon atoms, or about 12 to about 30 carbon atoms, or about 12 to about 25 carbon atoms, or about 12 to about 20 carbon atoms, or about 12 to about 15 carbon atoms, for example. The polymeric hydroxy fatty acid has, for example, about 2 to about 10, or about 2 to about 8, or about 2 to about 6, or about 3 to about 6, or about 3 to about 5, or about 3 to about 4, repeating fatty acid monomers. The fatty acid may be saturated or unsaturated (comprising at least one double or triple bond). The number of unsaturations (double or triple bonds) in the fatty acid of the fatty acid backbone may be 0 to about 10, or 0 to about 5, or 0 to about 4, or 0 to about 3, or 0 to about 2, or 0 to 1, or 1 to about 10, or 1 to about 5, or 1 to about 4, or 1 to about 3, or 1 to 2, or about 2 to about 10, or about 2 to about 5, or about 2 to about 4, or about 2 to about 3, for example. In some embodiments, the hydroxy fatty acid monomer that forms the polymeric hydroxy fatty acid has, for example, about 1 to about 10, or about 1 to about 8, or about 1 to about 6, or 1 to about 5, or 1 to about 4, or 1 to about 3, or 1 to 2, or one hydroxyl group(s).

In some embodiments the polymeric hydroxy fatty acid is a condensation polymer where a carboxyl group of one hydroxy fatty acid monomer reacts to form an ester with a hydroxyl group of another hydroxy fatty acid monomer. The hydroxyl group(s) may be attached to any carbon atom(s) of the fatty acid or to any substituent group attached to a carbon atom of the fatty acid chain (i.e., the linear chain of carbon atoms that determine the length of the fatty acid). In some embodiments the hydroxyl group (both free and derivatized such as by ester formation during polymerization) is on a non-terminal carbon atom of the fatty acid chain. In some embodiments the hydroxyl group is on a carbon atom of the fatty acid chain that is about 35% to about 70%, or about 35% to about 65%, or about 40% to about 70%, or about 40% to about 65%, for example, carbon atoms from the carbon atom of the carboxyl group. For example, for a poly(hydroxystearic acid) where the hydroxyl group is at the 12-position (on carbon atom 12 where the carboxyl carbon is carbon atom 1), the hydroxyl group would be 65% (11/17) from the carboxyl group.

In some embodiments, the polymeric hydroxy fatty acid is selected from the group consisting of poly(hydroxylauric acid), poly(hydroxymyristic acid), poly(hydroxypalmitic acid), poly(hydroxystearic acid) and poly(hydroxyarachidic acid). In some embodiments, the polymeric hydroxy fatty acid is selected from the group consisting of poly(hydroxylauric acid) (where the hydroxy of the fatty acid monomer is at carbon 5, 6 or 7), poly(hydroxymyristic acid) (where the hydroxy of the fatty acid monomer is at carbon 6, 7, 8 or 9), poly(hydroxypalmitic acid) (where the hydroxy of the fatty acid monomer is at carbon 7, 8, 9 or 10), poly(hydroxymargaric acid) (where the hydroxy of the fatty acid monomer is at carbon 7, 8, 9 or 10), poly(hydroxystearic acid) (where the hydroxy of the fatty acid monomer is at carbon 8, 9, 10, 11 or 12) and poly(hydroxyarachidic acid) (where the hydroxy of the fatty acid monomer is at carbon 8, 9, 10, 11, 12 or 13).

In a specific embodiment the organic polyacid is a material available from Lubrizol Corporation and Ciba Corporation (Suffolk Va.), which includes, for example, SOLSPERSE® SP3000, SOLSPERSE® SP9000, SOLSPERSE® SP21000, EFKA® 6525, EFKA® 7544, and EFKA® 7564, respectively.

The amount (by weight percent) of the organic polyacid is that amount (in conjunction with the amount of organic polyamine) sufficient to render the conductivity of the ink composition to a level discussed above, which is at least equal to or less than about 15 nanosiemens per centimeter. The amount is dependent on the nature of the particulate pigment, the nature of the hydrocarbon vehicle, the nature of the organic polyamine, the nature of the jetting mechanism for the ink, and the nature of additives for an ink, for example. In some embodiments the amount of the organic polyacid in the ink composition may be about 0.5 to about 10%, or about 0.5 to about 5%, or about 1 to about 4%, or about 1 to about 2%, or about 1%, for example. In some embodiments the amount of the organic polyacid in the ink composition is determined empirically by preparing ink compositions containing varying amounts of the components and measuring the conductivity of the ink composition.

The ratio of the organic polyamine to the organic polyacid in the ink composition may be about 1 to 1, or 1 to 2, or 1 to 3, or 1 to 4, or 1 to 5, or 2 to 1, or 3 to 1, or 4 to 1, or 5 to 1, for example, including fractions thereof (e.g., 1.1 to 1, or 1 to 2.1). In a specific embodiment, by way of illustration and not limitation, the organic polyamine is present in the ink composition at 1% (by weight) and the organic polyacid is present in the ink composition at 1% (by weight) and the ratio of organic polyamine to organic polyacid is 1 to 1. Other weight percents and other ratios may be employed depending on the nature of the hydrocarbon vehicle and the particulate pigment and the nature of the organic polyamine and the organic polyacid.

It should be noted that the organic polyamine and the organic polyacid referred to above are separate entities and are to be distinguished from a polymeric material having both organic polyamine and organic polyacid components such as a condensation polymer of an organic polyamine and an organic polyacid. The polyamine and polyacid may associate with each other through acid/base or Zwitterionic interactions but the association is not covalent as in the condensation polymer mentioned above.

In some embodiments the present invention is concerned with methods for preparing an ink composition. In some embodiments a particulate pigment is combined with a composition comprising a hydrocarbon vehicle, an organic polyamine and an organic polyacid. The composition is prepared by combining appropriate amounts of an organic polyamine and an organic polyacid in a hydrocarbon. The organic polyamine and the organic polyacid are mixed with the hydrocarbon under conditions such that the organic polyamine and the organic polyacid become dissolved in the hydrocarbon. The mixture may be agitated by, for example, stirring, shaking, homogenizing or blending, or by combinations of the above, for about 5 to about 120 minutes, or about 5 to about 60 minutes, or about 5 to about 45 minutes, or about 5 to about 30 minutes, or about 10 to about 30 minutes, or about 15 to about 30 minutes, for example. The temperature during formation of the solution may be about 10° C. to about 100° C., about 10° C. to about 80° C., or about 10° C. to about 60° C., or about 10° C. to about 50° C., or about 10° C. to about 40° C., for example. In some embodiments ambient temperature is employed.

A particulate pigment is added to the composition prepared as discussed above to form the ink composition. The mixture is treated under conditions under which the particulate pigment becomes dispersed in the hydrocarbon vehicle. In some embodiments the composition is agitated for a period of about 10 to about 100 minutes, or about 10 to about 80 minutes, or about 10 to about 60 minutes, or about 10 to about 40 minutes, or about 20 to about 100 minutes, or about 20 to about 80 minutes, or about 20 to about 60 minutes, or about 20 to about 40 minutes, or about 25 to about 50 minutes, or about 25 to about 35 minutes, for example. Agitation may be accomplished, for example, by sonication, ultrasonication, microfluidization or bead milling, or a combination of the above.

The temperature during formation of the dispersion may be about 10° C. to about 300° C., or about 10° C. to about 250° C., or about 10° C. to about 200° C., or about 10° C. to about 150° C., or about 10° C. to about 100° C., or about 10° C. to about 80° C., or about 10° C. to about 60° C., or about 10° C. to about 50° C., or about 10° C. to about 40° C., or about 20° C. to about 300° C., or about 20° C. to about 250° C., or about 20° C. to about 200° C., or about 20° C. to about 150° C., or about 20° C. to about 100° C., or about 20° C. to about 80° C., or about 20° C. to about 60° C., or about 20° C. to about 50° C., or about 20° C. to about 40° C., for example. The temperature may be constant during the agitation or the temperature may be varied from one agitation method to another or within one agitation method. As discussed above, the ratio (by weight percent) of the organic polyamine and the organic polyacid in the hydrocarbon vehicle is sufficient to render the conductivity of the ink composition (at the concentration of the particulate pigment) equal to or less than 15 nanosiemens per centimeter.

The period of time during which the dispersed ink composition maintains acceptable dispersion of the particulate pigment depends on the nature of the hydrocarbon vehicle, the nature of the organic polyamine, the nature of the organic polyacid, the nature of the particulate pigment, and the nature of its final use, for example. Acceptable dispersion depends on the nature of the printing process in which the composition is employed. In some embodiments dispersion is acceptable when the particulate pigment remains at least 80% dispersed, or at least 85% dispersed, or at least 90% dispersed, or at least 91% dispersed, or at least 92% dispersed, or at least 93% dispersed, or at least 94% dispersed, or at least 95% dispersed, or at least 96% dispersed, or at least 97% dispersed, or at least 98% dispersed, or at least 99% dispersed, or 100% dispersed, for example, for a period of at least 5 days, or at least 6 days, or at least 7 days, or at least 8 days, or at least 9 days, or at least 10 days, or at least 11 days, or at least 12 days, or at least 13 days, or at least 14 days, or at least 15 days, or at least 16 days, or at least 20 days, or at least 30 days, or at least 60 days, or at least 90 days, or at least 180 days, or at least 360 days, for example. Percentage of particles dispersed is defined as the ratio of the pigment suspension height to the height of the total ink volume. The level of dispersion may also be measured as degree of sedimentation, which is the reverse of the percentage of dispersed particles. Level of sedimentation may be measured by observation. Typically, an accelerated storage stability test is carried out for this type of measurement, during which ink dispersions are subjected to repetitive freeze-thaw cycles and the sample is then observed to determine the physical height of sedimentation, for example.

In some embodiments particular combinations of organic polyamine, organic polyacid and hydrocarbon vehicle are selected based on the conductivity (less than about 15 ns/cm) and sedimentation (less than about 20%, or less than about 15%, or less than about 10%, or less than about 5% for a period of 16 days) of a resulting ink composition. Thus, the process of selection of the appropriate components of the ink composition may be carried out empirically. Considerations include, for example, amount of the organic polyamine and the organic polyacid in the ink composition, the ratio of the organic polyamine to the organic polyacid, and the level of protonation of the organic polyamine.

One embodiment of an ink composition comprises aluminum oxide flakes (average particle size of 350 nm) (1% by weight) dispersed in a mixture of $C_{11}$-$C_{13}$ isoalkanes (boiling point range 189 to 203° C.) as a hydrocarbon vehicle. The ink composition also includes a polyethylene amine as the organic polyamine (1.5% by weight) having a molecular weight of 1200 amu and an average of 3 amine groups per molecule of polyamine and a poly(8-hydroxypalmitic acid) (1% by weight) having a molecular weight of 1500 amu. The conductivity of the ink composition is 2 ns per cm as measured by a low field conductivity meter. The ink composition has a level of sedimentation of 95% after 16 days measured as discussed above.

One embodiment of an ink composition comprises silicon dioxide particles encapsulated in a latex polymer (emulsion polymerization using silicon dioxide particles and ethyl acrylate) (average particle size of 100 nm) (2% by weight) dispersed in a mixture of $C_{10}$-$C_{13}$ isoalkanes (boiling point range 189 to 203° C.) as a hydrocarbon vehicle. The ink composition also includes a polyethylene amine as the organic polyamine (1% by weight) having a molecular weight of 1200 amu and an average of 3 amine groups per molecule of polyamine (with 50% of amine groups protonated) and a poly(9-hydroxymargaric acid) (1% by weight) having a molecular weight of 2500 amu. The conductivity of the ink composition is 1.5 ns per cm as measured by a low field conductivity meter. The ink composition has a level of sedimentation of 92% after 16 days measured as discussed above.

One embodiment of an ink composition comprises phthalocyanine green pigment (average particle size of 250 nm) (1% by weight) dispersed in a mixture of $C_{14}$-$C_{19}$ isoalkanes (boiling point range 272 to 311° C.) as a hydrocarbon vehicle. The ink composition also includes an organic polyamine (poly(lauric acid) backbone with penta(ethylene amine) groups pendant from the backbone as an oligomeric amine-containing group) (2% by weight) having a molecular weight of 1500 amu and an average of 5 amine groups per molecule of polyamine and a poly(8-hydroxymyristic acid) (1.5% by weight) having a molecular weight of 1800 amu. The conductivity of the ink composition is 2.5 ns per cm as measured by a low field conductivity meter. The ink composition has a level of sedimentation of 94% after 16 days measured as discussed above.

One embodiment of an ink composition comprises Pigment Red 73 particles encapsulated in a latex polymer (emulsion polymerization using Pigment Red 73 particles and styrene) (average particle size of 250 nm) (3% by weight) dispersed in a mixture of $C_{12}$-$C_{14}$ alkanes (boiling point range 223 to 254° C.) as a hydrocarbon vehicle. The ink composition also includes a polyethylene having pendant cyclohexyl groups comprising a dimethyl amine group as an organic polyamine (1% by weight) having a molecular weight of 2000 amu and an average of 5 amine groups per molecule of polyamine and a poly(7-hydroxylauric acid) (2% by weight) having a molecular weight of 1400 amu. The conductivity of the ink composition is 3 ns per cm as measured by a low field conductivity meter. The ink composition has a level of sedimentation of 96% after 16 days measured as discussed above.

The ink compositions of the present embodiments find use in many different techniques, which include, for example, digital printing, laser printing, electro-ink printing, electro-photographic printing, displays and ink jet printing. Embodiments of the ink compositions may be employed, for example, as electro-photographic inks for electro-printing, as inkjet inks for inkjet printers and as electrophoretic inks for displays.

Definitions:

The following provides definitions for terms and phrases used above, which were not previously defined.

The phrase "at least" as used herein means that the number of specified items may be equal to or greater than the number recited. The phrase "about" as used herein means that the number recited may differ by plus or minus 10%; for example, "about 5" means a range of 4.5 to 5.5. The term "between" when used in conjunction with two numbers such as, for example, "between about 2 and about 50" includes both of the numbers recited.

The term "alkane" as used herein means a branched (iso-, tertiary (neo), unbranched, or cyclic saturated hydrocarbon, which typically, although not necessarily, contains from 1 to about 50 carbon atoms, or 1 to about 40 carbon atoms, or 1 to about 30 carbon atoms, for example. An "isoalkane" is a branched chain alkane whose next-to-last carbon atom is bonded to a single methyl group. A "neoalkane" or "tertiary alkane" is a branched chain alkane whose next-to-last carbon atom is bonded to two methyl groups.

The term "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, and thioaryl.

The term "heteroatom" as used herein means nitrogen, oxygen, phosphorus or sulfur. The term "heterocyclic" means having an alicyclic or aromatic ring structure, which includes one or more heteroatoms.

The term "aromatic" as used herein includes monocyclic rings, bicyclic ring systems, and polycyclic ring systems, in which the monocyclic ring, or at least a portion of the bicyclic ring system or polycyclic ring system, is aromatic (exhibits, e.g., π-conjugation). The monocyclic rings, bicyclic ring systems, and polycyclic ring systems of the aromatic ring systems may include carbocyclic rings and/or heterocyclic rings. The term "carbocyclic ring" denotes a ring in which each ring atom is carbon. The term "heterocyclic ring" denotes a ring in which at least one ring atom is not carbon and comprises 1 to 4 heteroatoms.

The term "alkyl" as used herein means a branched, unbranched, or cyclic saturated hydrocarbon group, which typically, although not necessarily, contains from 1 to about 50 carbon atoms, or 1 to about 40 carbon atoms, or 1 to about 30 carbon atoms for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example.

As used herein, the term "alkenyl" means a linear, branched or cyclic hydrocarbon group of 2 to about 50 carbon atoms, or 2 to about 40 carbon atoms, or 2 to about 30 carbon atoms or more containing at least one double bond, such as ethenyl, n-propenyl, isopropenyl, n-butenyl, isobutenyl, octenyl, decenyl, tetradecenyl, hexadecenyl, eicosenyl, and tetracosenyl, for example.

As used herein, the term "alkynyl" means a linear, branched or cyclic hydrocarbon group of 2 to about 50 carbon atoms, or 2 to about 40 carbon atoms, or 2 to about 30 carbon atoms or more containing at least one triple bond, such as ethynyl, n-propynyl, isopropynyl, n-butynyl, isobutynyl, octynyl, decynyl, tetradecynyl, hexadecynyl, eicosynyl, and tetracosynyl, for example.

The term "alkoxy" as used herein means an alkyl group bound to another chemical structure through a single, terminal ether linkage, having 1 to about 50 carbon atoms, or 1 to about 40 carbon atoms, or 1 to about 30 carbon atoms.

The term "alkenoxy" as used herein means an alkenyl group bound to another chemical structure through a single, terminal ether linkage, having 1 to about 50 carbon atoms, or 1 to about 40 carbon atoms, or 1 to about 30 carbon atoms.

The term "alkynoxy" as used herein means an alkynyl group bound to another chemical structure through a single, terminal ether linkage, having 1 to about 50 carbon atoms, or 1 to about 40 carbon atoms, or 1 to about 30 carbon atoms.

The term "thioalkyl" as used herein means an alkyl group bound to another chemical structure through a single, terminal thio (sulfur) linkage, having 1 to about 50 carbon atoms, or 1 to about 40 carbon atoms, or 1 to about 30 carbon atoms.

The term "thioalkenyl" as used herein means an alkenyl group bound to another chemical structure through a single, terminal thio (sulfur) linkage, having 1 to about 50 carbon atoms, or 1 to about 40 carbon atoms, or 1 to about 30 carbon atoms.

The term "thioalkynyl" as used herein means an alkynyl group bound to another chemical structure through a single, terminal thio (sulfur) linkage, having 1 to about 50 carbon atoms, or 1 to about 40 carbon atoms, or 1 to about 30 carbon atoms.

The term "aryl" means a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more. Aryl groups include, for example, phenyl, naphthyl, anthryl, phenanthryl, biphenyl, diphenylether, diphenylamine, and benzophenone.

The term "aryloxy" as used herein means an aryl group bound to another chemical structure through a single, terminal ether (oxygen) linkage, having from 5 to about 50 carbon atoms, or 5 to about 40 carbon atoms, or 5 to 30 carbon atoms or more. The term "phenoxy" as used herein is aryloxy wherein aryl is phenyl.

The term "thioaryl" as used herein means an aryl group bound to another chemical structure through a single, terminal thio (sulfur) linkage, having from 5 to about 50 carbon atoms, or 5 to about 40 carbon atoms, or 5 to 30 carbon atoms or more. The term "thiophenyl" as used herein is thioaryl wherein aryl is phenyl.

EXAMPLES

Unless otherwise indicated, materials in the experiments below may be purchased from Aldrich Chemical Company, St. Louis Mo. Parts and percentages are by weight unless indicated otherwise.

Dispersions were prepared by dissolving 1- 2% of organic polyamine (SOLSPERSE®, Lubrizol Corporation) and 1-2% of organic polyacid (SOLSPERSE®, Lubrizol Corporation) in ISOPAR® L isoparaffinic solvent (ExxonMobil) at a temperature of 30° C. for a period of 30 minutes. Then, 5% of an encapsulated cyan pigment (prepared by emulsion polymerization using cyan pigment (BASF Corporation, Florham Park N.J.) and a combination of styrene, hexyl methacrylate, methacrylic acid, and ethylene glycol dimethyacrylate monomers (44:50:5:1) (Aldrich Chemical Company)) were added to the solution from above and the mixture was subjected to sonication (Branson sonicator, Model No. B-22-4, 50-60 kHz, SmithKline Company, Conshohocken PA) in a water bath for 30 minutes at 25° C., followed by ultrasonification (using Model No. VCX-750, Vibracell Sonic and Materials, Danbury, Conn.) in ice bath with a 6 mm probe at 65% amplitude for 2 minutes on, 5 seconds on/off pulses. The dispersions were allowed to sit at room temperature and sedimentation was evaluated over time. All dispersions were re-dispersed by gentle swirling on the twelfth day and sedimentation was re-evaluated visually after 4 days. Conductivity was measured using a handheld low field conductivity meter. The results are summarized in Table 1 below.

TABLE 1

| Organic polyamine | Organic polyacid | Conductivity (ns/cm) | Dispersion % (16 days) |
|---|---|---|---|
| OS 240430E | OS 243355 | 0.575 | 98 |
| SP19000 | SP9000 | 0.391 | 98 |
| SP19000 | SP3000 | 0.354 | 90 |
| SP19000 | SP21000 | 0.341 | 90 |

OS 240430E is a developmental dispersant from Lubrizol Corporation containing repeating units of tertiary amines.
OS 243355 is a non-ionic polyamine from Lubrizol Corporation.
SP19000 is a cationic polyamine having an unsaturated polymeric fatty acid backbone from Lubrizol Corporation.
SP9000 is a cationic polyamine having a saturated polymeric fatty acid backbone and is from Lubrizol Corporation.
SP3000 is a saturated polymeric fatty acid from Lubrizol Corporation.
SP21000 is poly(12-hydroxystearic acid) from Lubrizol Corporation.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Moreover, examples herein are intended to be illustrative only and are presented for discussion purposes and not by way of limitation. Many modifications and variations are possible in view of the above teachings. The embodiments were chosen and described in order to explain the principles of the invention and its practical applications and to thereby enable others skilled in the art to utilize the invention.

What is claimed is:
1. An ink composition comprising:
(a) a particulate pigment,
(b) a hydrocarbon vehicle,
(c) an organic polyamine, and
(d) an organic polyacid,
wherein a ratio of a weight percent of the organic polyamine to a weight percent of the organic polyacid in the hydrocarbon vehicle is sufficient to render a conductivity of the ink composition to less than or equal to 15 nanosiemens per centimeter.

2. The composition according to claim 1, wherein the particulate pigment is an encapsulated pigment.

3. The composition according to claim 1, wherein the hydrocarbon vehicle is an isoparaffinic solvent.

4. The composition according to claim 1, wherein the organic polyamine is about 1 to about 10,000 monomer units in length and has at least 3 free amine groups per molecule of organic polyamine.

5. The composition according to claim 4, wherein the organic polyamine comprises an unsaturated polymeric fatty acid backbone and at least one oligomeric amine-containing group.

6. The composition according to claim 1, wherein the organic polyamine is a polyethylene amine.

7. The composition according to claim 1, wherein the organic polyacid is about 1 to about 10,000 monomer units in length.

8. The composition according to claim 7, wherein the organic polyacid is a polymeric hydroxy fatty acid.

9. The composition according to claim 8, wherein a hydroxy fatty acid monomer of the polymeric hydroxy fatty acid comprises 10 to 30 carbon atoms and 1 to 5 hydroxy groups.

10. The composition according to claim 8, wherein the polymeric hydroxy fatty acid is selected from the group consisting of poly(hydroxy lauric acid), poly(hydroxy myristic acid), poly(hydroxy palmitic acid), poly(hydroxy stearic acid) and poly(hydroxy arachidic acid).

11. A method for preparing an ink composition, the method comprising:
(a) combining a particulate pigment with a composition comprising a hydrocarbon vehicle, an organic polyamine, and an organic polyacid, wherein a ratio by weight percent of the organic polyamine to the organic polyacid in the hydrocarbon vehicle is sufficient to render a conductivity of the ink composition to less than or equal to 15 nanosiemens per centimeter; and
(b) subjecting the combination to conditions under which the particulate pigment is dispersed in the composition.

12. The method according to claim 11, wherein the particulate pigment is an encapsulated pigment.

13. The method according to claim 11, wherein the hydrocarbon vehicle is an isoparaffinic solvent.

14. The method according to claim 11, wherein the organic polyamine comprises an unsaturated polymeric fatty acid backbone and at least one oligomeric amine-containing group and wherein the organic polyacid is a polymeric hydroxy fatty acid.

15. An ink composition comprising:
(a) a particulate pigment;
(b) an isoparaffinic hydrocarbon vehicle;
(c) an organic polyamine comprising an unsaturated polymeric fatty acid backbone and one or more amine-containing groups; and
(d) a poly(12-hydroxystearic acid),
wherein a ratio of a weight percent of the organic polyamine to a weight percent of the poly(12-hydroxystearic acid) in the isoparaffinic hydrocarbon vehicle is sufficient to render a conductivity of the ink composition to less than or equal to 15 nanosiemens per centimeter.

16. The composition according to claim 1, wherein the organic polyamine is a polyethylene N-substituted amine with its substituent selected from the group consisting of alkyl, alkoxy, aryl, aryloxy, alkenyl, alkenoxy, alkynyl, alkynoxy, thioalkyl, thioalkenyl, thioalkynyl, and thioaryl.

17. The composition according to claim 1, wherein the organic polyamine is a polyethylene comprising one or more pendant groups selected from the groups consisting of primary amine groups, secondary amine groups, tertiary amine groups, succinimide groups, aniline groups, and pyrrole groups.

* * * * *